US008031597B2

(12) United States Patent
Jung (10) Patent No.: US 8,031,597 B2
(45) Date of Patent: Oct. 4, 2011

(54) METHOD AND APPARATUS FOR PERFORMING DATA COMMUNICATION BETWEEN MOBILE COMMUNICATION TERMINAL AND WIRELINE COMMUNICATION SERVER

(75) Inventor: You-La Jung, Seongnam-Si (KR)

(73) Assignee: Curitel Communications, Inc., Seoul (KR)

( * ) Notice: Subject to any disclaimer, the term of this patent is extended or adjusted under 35 U.S.C. 154(b) by 1097 days.

(21) Appl. No.: 11/017,867

(22) Filed: Dec. 22, 2004

(65) Prior Publication Data

US 2005/0185579 A1 Aug. 25, 2005

(30) Foreign Application Priority Data

Feb. 20, 2004 (KR) .................... 10-2004-0011357

(51) Int. Cl.
*H04L 12/24* (2006.01)
(52) U.S. Cl. .................... 370/230.1; 370/235
(58) Field of Classification Search .............. 370/216, 370/229, 235, 236, 252, 253, 338
See application file for complete search history.

(56) References Cited

U.S. PATENT DOCUMENTS

| 5,974,028 | A  | * | 10/1999 | Ramakrishnan | 370/229 |
| 6,219,713 | B1 | * | 4/2001 | Ruutu et al. | 709/235 |
| 6,249,530 | B1 | * | 6/2001 | Blanco et al. | 370/468 |
| 6,493,316 | B1 | * | 12/2002 | Chapman et al. | 370/231 |
| 6,646,987 | B1 | * | 11/2003 | Qaddoura | 370/231 |
| 6,757,245 | B1 | * | 6/2004 | Kuusinen et al. | 370/230 |
| 6,961,327 | B2 | * | 11/2005 | Niu | 370/338 |
| 7,061,856 | B2 | * | 6/2006 | Banerjee | 370/216 |
| 7,237,007 | B2 | * | 6/2007 | Kamath et al. | 709/206 |
| 2002/0154602 | A1 | * | 10/2002 | Garcia-Luna-Aceves et al. | 370/230 |
| 2004/0017773 | A1 | * | 1/2004 | Piche et al. | 370/232 |
| 2004/0190540 | A1 | * | 9/2004 | Miyake et al. | 370/428 |
| 2005/0041586 | A1 | * | 2/2005 | Jiang | 370/236 |
| 2005/0068894 | A1 | * | 3/2005 | Yu et al. | 370/235 |
| 2005/0254420 | A1 | * | 11/2005 | Wager et al. | 370/230 |
| 2007/0115814 | A1 | * | 5/2007 | Gerla et al. | 370/230 |

FOREIGN PATENT DOCUMENTS

KR 2003-0065156 A 8/2003

OTHER PUBLICATIONS

Postel J., et al., RFC 793—Transmission Control Protocol, Internet Engineering Task Force, Sep. 1981, pp. 15-18.*
Mathis, M., et al., RFC 2018—TCP Selective Acknowledgement Options, Internet Engineering Task Force, Oct. 1996, pp. 1-4.*

* cited by examiner

*Primary Examiner* — Ricky Ngo
*Assistant Examiner* — Ben Liu
(74) *Attorney, Agent, or Firm* — H.C. Park & Associates, PLC

(57) ABSTRACT

A method of processing an error frame that occurs in packet data communication between a mobile station and a communication server which exchanges packets with the mobile station over a radio network may be carried out by a mobile station. The method carried out by the mobile station includes the steps of: a) detecting an error having occurred in received packet data during communication in a radio network; and b) requesting the communication server to retransmit the packet data without reducing the congestion window size. In addition, the method carried out by a communication server includes the steps of: a) detecting an error having occurred in transmitted packet data during communication in a radio network; and b) retransmitting the packet data without reducing the congestion window size.

11 Claims, 5 Drawing Sheets

METHOD AND APPARATUS FOR PERFORMING DATA COMMUNICATION BETWEEN MOBILE COMMUNICATION TERMINAL AND WIRELINE COMMUNICATION SERVER

This application claims the priority of Korean Patent Application No. 2004-011357, filed on Feb. 20, 2004, in the Korean Intellectual Property Office, the disclosure of which is incorporated herein in its entirety by reference.

BACKGROUND OF THE INVENTION

1. Field of the Invention

The present invention relates to a data communication technique used in a mobile communication network and, more particularly, to a method of processing an error frame that occurs in packet data communication between a mobile communication terminal and a communication server which exchanges packets with the mobile communication terminal over a radio network (RN).

2. Description of the Related Art

Figure 1:
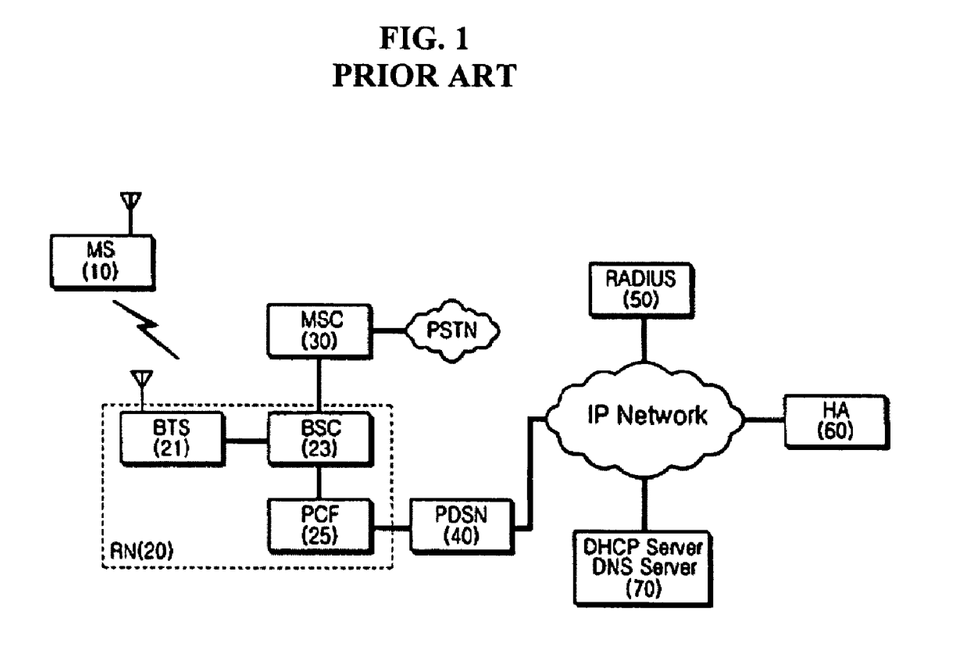
FIG. 1 is a block diagram showing a well-known 3GPP2 network topology.

FIG. 1 is a block diagram showing a well-known 3GPP2 network topology. A mobile station (MS) 10 is indicative of a mobile communication terminal, such as a personal computer with wireless adapters, a mobile handset, a Wireless Application Protocol (WAP) terminal, or a mobile communication modem.

A radio network (RN) 20, also called a radio core network, is comprised of a base transceiver system (BTS) 21, a base station controller (BSC) 23, and a packet control function (PCF) 25. The RN 20 manages the mobility of the MS 10 and may authenticate the MS 10 using a Visitor Location Register (VLR) and a Home Location Register (HLR), which are connected to a mobile switching center (MSC) 30. The RN 20 controls data transmission between the MS 10 and a packet data serving node (PDSN) 40, and performs data buffering between the MS 10 and the PDSN 40. Furthermore, the RN 20 performs a paging process when data is transferred to the MS 10 over an Internet Protocol (IP) network.

Once a basic authentication process of a data call has been completed, a Generic Routing Encapsulation (GRE) protocol establishes a virtual connection between the RN 20 and the PDSN 40.

The BSC 23 provides call control and signaling function in addition to providing remote management function and handoff function between BTSs and BSCs.

The BSC 23 communicates to the PDSN 40 through the PCF over the GRE tunnel. The PCF 25 and the PDSN 40 communicate with each other using a standard interface known as the RN-to-PDSN interface (R-P interface), which has two components: the A11 interface, used for control messages, and the A10 interface, used for user data. The PCF 25 provides data buffering and packet segmentation functions so that link layer packets received from the PDSN 40 can be transmitted to the MS 10 over an air interface. While the PCF 25 may be incorporated in the BSC 23, the PCF 25 is usually configured as a separate system.

The PDSN 40 provides access to the Internet, intranets, and WAP servers for the MSs that use the RN 20. The Point-to-Point Protocol, or PPP, is commonly used to establish a direct connection between the PDSN 40 and the MS 10. The PDSN 40 uses a Remote Authentication Dial-In User Service (RADIUS) server 50 for user authentication and traffic management, then forwards traffic to a gateway router/home agent at the designated IP network.

The RADIUS server 50 interacts with the PDSN 40 to perform AAA (Authentication, Authorization, Accounting) functions. That is, the RADIUS server 50 verifies that a user is a valid subscriber, determines what services are available for the user, and tracks usage for billing.

A Home Agent (HA) 60 maintains mobile user registrations and tunnels packets destined for the mobile client to the PDSN 40. The HA can perform dynamic home address assignment for the MS 10 from address pools configured locally, through Dynamic Host Configuration Protocol (DHCP), or from the RADIUS server 50. Upon receiving a registration request message from the MS 10, the HA 60 allows a corresponding IP address to be used when a method of statically assigning the IP address is employed. On the other hand, when a method of dynamically assigning the IP address is employed, the HA 60 allows an IP address to be used by assigning the IP address and transmitting a registration reply message. When the MS 10 moves to another PDSN area, it notifies the HA 60 of the PDSN area.

A Dynamic Host Configuration Protocol (DHCP) server/Domain Name System (DNS) server 70 is indicative of a server capable of automatically assigning users IP addresses. The DHCP server/DNS server 70 is used for establishing an IP address, a domain name, etc.

The DNS server is used for converting a host name into an IP address and vice versa. The DNS server may update an IP address for a specific host name upon receiving a DNS update message according to the RFC2136 protocol.

When the MS 10 capable of using a packet data service over the above-mentioned mobile communication network requests the packet data service, the BSC 23 and PCF 25 determine which PDSN should transmit packet data. At this time, a radio traffic channel and a radio link protocol (RLP) are established between the MS 10 and the BSC 23. The A8 interface is used to provide a path for user traffic between the BSC 23 and the PCF 25 for packet data services. In addition, the A10 interface is used to provide a path for user traffic between the PCF 25 and the PDSN 40 for packet data services. In this case, the packet data service in an 'active' state implies that the MS 10 occupies a radio traffic channel, maintains the RLP link and the A8 link, and transmits/receives packet data.

Figure 2:
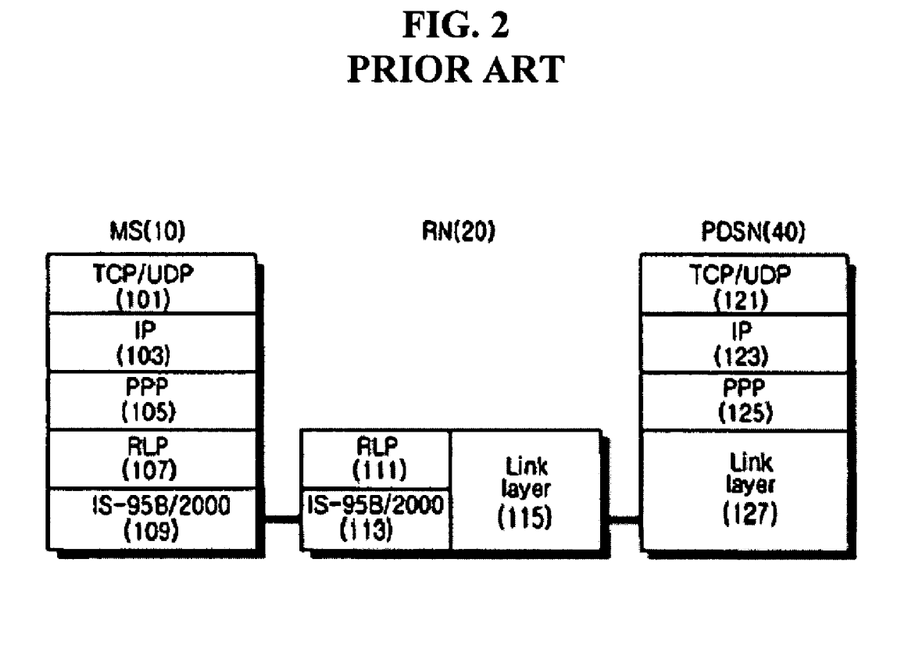
FIG. 2 is a schematic diagram showing a protocol stack for data call transfer in a conventional mobile communication system.

FIG. 2 is a schematic diagram showing a protocol stack for data call transfer in a conventional mobile communication system. The protocol stack includes a physical layer, a Radio Link Protocol (RLP), a Point-to-Point Protocol (PPP), an Internet Protocol (IP), a Transmission Control Protocol (TCP), a User Datagram Protocol (UDP), etc.

The physical layer is the lowest layer of the Open System Interconnection Reference Model (OSI Reference Model), an International Standards Organization (ISO) standard for worldwide communications that defines a framework for implementing protocols in seven layers. The physical layer, which is implemented in hardware, defines all electrical and physical specifications for devices. IS-953/2000 protocol 109 corresponds to the physical layer.

The RLP 107 is used to provide reliable data service over the air interface between the MS 10 and a base station. The RLP 107 also employs an Automatic Repeat Request (ARQ) scheme to request retransmission of messages which have errors or fail to arrive in order to ensure reliable transfer of data.

The PPP 105 is a method of connecting a computer to the Internet using a phone line. Working in the data link layer of the OSI Reference Model, the PPP 105 sends the computer's TCP/IP packets to a server that puts them onto the Internet.

The IP 103 is a data-oriented protocol used by source and destination hosts for communicating data across a packet-switched internetwork. The IP 103 specifies the format of packets, also called datagrams, and the addressing scheme.

The TCP is a connection-oriented, reliable delivery byte-stream transport layer protocol. Whereas the IP 103 protocol deals only with packets, the TCP enables two hosts to establish a connection and exchange streams of data. The TCP guarantees delivery of data and also guarantees that packets will be delivered in the same order in which they were sent.

The UDP is an alternative to the TCP and, together with IP, is sometimes referred to as UDP/IP. Like the TCP, the UDP uses the IP 103 to actually get packets from one computer to another. Unlike TCP, the UDP does not provide the service of dividing a message into packets (datagrams) and reassembling it at the other end. Specifically, the UDP does not provide sequencing of the packets that the data arrives in. This means that the application program that uses UDP must be able to make sure that the entire message has arrived and is in the right order. Network applications that want to save processing time because they have very small data units to exchange may prefer UDP to TCP.

The MS 10 establishes a session with a communication network connection unit such as the PCF 25 using the physical layer and the RLP. The MS 10 establishes a PPP session with the PDSN 40.

The MS 10 establishes a session with a supplementary service unit, which is provided in a mobile communication service system, using the TCP/IP or UDP/IP. Wireless data communications using the TCP/IP or UDP/IP is available only when a PPP connection is established between the MS and the PDSN.

Examples of applications required for accessing the Internet via the mobile communication terminal include a browser and a software platform such as JAVA, Binary Runtime Environment for Wireless (BREW), or Graphics Virtual Machine (GVM).

In the case when the MS or a communication server detects one or more errors during TCP communication in the above-mentioned communication network, a congestion control scheme widely used in typical wireline network communications has been used for error processing. Specifically, in the case when a communication error is detected from a received TCP packet or an acknowledgement (ACK) response to a transmitted packet is not received until a TCP's retransmission timer expires, the MS or the communication server determines the packet to have been lost due to congestion, and reduces the congestion window size of a transmission side to retransmit the packet.

The reduction in congestion window size leads to a significant decrease in the effective transfer rates of the transmission side. The occurrence of packet losses in a typical wireline network is mainly caused by a waiting time based on a priority logic mechanism in a routing process. However, in case of the radio network, the packet losses may occur due to a high bit error rate (BER) compared to that of the wireline network, or multi-path fading. In addition, the packet losses in the radio network may occur due to the rerouting of packets during handoff. Consequently, determining the packet losses in the radio network to have occurred due to congestion causes a problem in terms of transmission efficiency.

SUMMARY OF THE INVENTION

The present invention provides a method of improving transmission efficiency in a mobile communication network in which a transmission error has occurred.

The present invention also provides a method of processing a transmission error having occurred in a radio network in a different manner from a transmission error having occurred in a wireline network.

In accordance with an aspect of the present invention, there is provided a packet data communication method carried out by an MS connected to a communication server over a mobile communication network, the method comprising the steps of: a) detecting an error having occurred in received packet data during communication in a radio network; and b) requesting the communication server to retransmit the packet data without reducing the congestion window size.

The step a) may comprise the step of detecting, by the MS, a frame error in a physical layer or a link layer associated with the radio network and notifying a TCP (Transmission Control Protocol) layer of the occurrence of the frame error.

The step b) may comprise the step of transmitting a dummy segment having a TCP header with a certain flag set.

In accordance with another aspect of the present invention, there is provided a packet data communication method carried out by an MS connected to a communication server over a mobile communication network, the method comprising the steps of: c) detecting an error having occurred in transmitted packet data during communication in a radio network; and d) retransmitting the packet data without reducing the congestion window size.

The method may further comprise the steps of: detecting an error having occurred in transmitted packet data during communication in a wireline network; and retransmitting the packet data after reducing the congestion window size.

In the step c), the MS may determine a transmission error to have occurred if the MS is notified by the communication server of the error occurrence in the radio network or if the MS does not receive within a predetermined time from the communication server an ACK (acknowledgement) message for acknowledging the receipt of the packet data.

The communication server may notify the MS of the error occurrence by sending a dummy segment having a TCP header with a certain flag set.

In accordance with another aspect of the present invention, there is provided an MS connected to a communication server over a mobile communication network, comprising data communication means which retransmits or requests to retransmit packet data without reducing the congestion window size when an error is detected by the MS in the packet data transmitted or received during communication in a radio network.

The data communication means comprises a data transmitter and a data receiver, wherein the data transmitter including: a radio network transmission error detector for determining whether an error has occurred in the transmitted packet data during communication in the radio network; and a radio network retransmitter for retransmitting the packet data without reducing the congestion window size when the occurrence of the error is detected by the radio network transmission error detector, and the data receiver including: a radio network reception error detector for determining whether an error has occurred in the received packet data during communication in the radio network; and a radio network retransmission requester for requesting the communication server to retransmit the packet data without reducing the congestion window size when the occurrence of the error is detected by the radio network reception error detector.

The radio network reception error detector may detect a frame error in a physical layer or a link layer associated with the radio network and notifying a TCP layer of the occurrence of the frame error.

The radio network retransmission requester may transmit a dummy segment having a TCP header with a certain flag set.

The radio network transmission error detector may determine the error to have occurred in the transmitted packet data when the radio network transmission error detector is notified by the communication server of the error occurrence or does not receive within a predetermined time from the communication server an ACK message for acknowledging the receipt of the packet data.

The radio network transmission error detector may detect the notification of the communication server by checking a certain flag in the TCP header.

In accordance with another aspect of the present invention, there is provided a packet data communication method carried out by a communication server which performs data communication with a plurality of MSs, the method comprising the steps of: e) detecting an error having occurred in received packet data during communication in a radio network; and f) requesting the MSs to retransmit the packet data without reducing the congestion window size.

The step e) may comprise the step of detecting, by the communication server, a frame error in a physical layer or a link layer associated with the radio network.

The step f) may comprise the step of transmitting a dummy segment having a TCP header with a certain flag set.

In accordance with another aspect of the present invention, there is provided a packet data communication method carried out by a communication server which performs data communication with a plurality of MSs, the method comprising the steps of: g) detecting an error having occurred in transmitted packet data during communication in a radio network; and h) retransmitting the packet data without reducing the congestion window size.

The method may further comprise the steps of: detecting an error having occurred in transmitted packet data during communication in a wireline network; and retransmitting the packet data after reducing the congestion window size.

In the step g), the communication server may determine a transmission error to have occurred if the communication server is notified by the MS of the error occurrence in the radio network or if the communication server does not receive within a predetermined time from the MS an ACK message for acknowledging the receipt of the packet data.

The MS may notify the communication server of the error occurrence by sending a dummy segment having a TCP header with a certain flag set.

It should be noted that the term "MS" described in the present invention is indicative of a data communication terminal capable of accessing a mobile communication network, such as a mobile communication terminal, a communication server, and a notebook computers.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Exemplary embodiments of the present invention will be described in detail with reference to the annexed drawings, where the same or similar elements are denoted by the same reference numerals even though they are depicted in different drawings.

Figure 3:
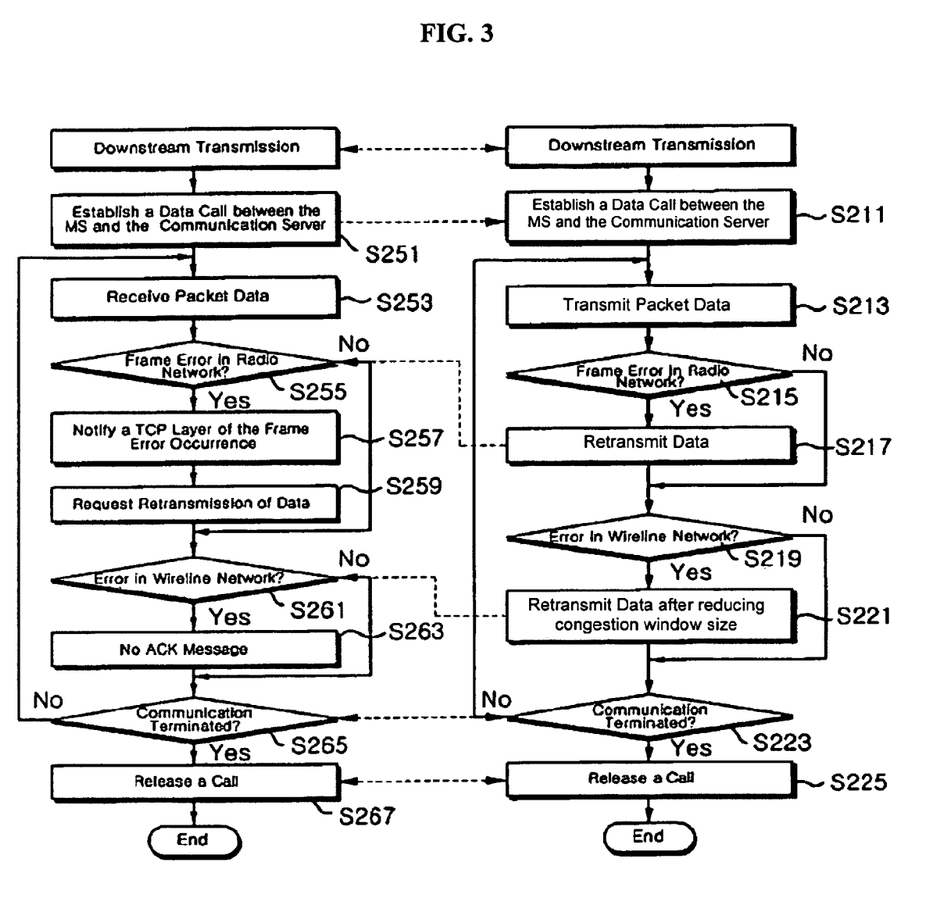
FIG. 3 is a flowchart showing downstream data communication in accordance with an embodiment of the present invention.

FIG. 3 is a flowchart showing downstream data communication in accordance with an embodiment of the present invention. A packet data communication method in an MS connected to a communication server over a mobile communication network is initiated by establishing a data call between the MS and the communication server (steps S251 and S211). Call setup processes are well known in the art.

While the communication server is typically indicative of the PDSN 40 serving as an Internet interface unit shown in FIGS. 1 and 2, it should be noted that the communication server is not limited to the PDSN 40. That is, the communication server may be an Internet server in a wireline network connected to the Internet interface unit or radio network equipment 20, which is capable of processing the physical and link layers.

Subsequently, the communication server transmits packet data (step S213). The MS 10 receives the packet data (step S253). In this case, the packet data communication method in the MS 10 includes the step of detecting errors having occurred in received packet data during communication in a radio network (steps S255 and S257) and the step of requesting the communication server to retransmit the packet data without reducing the congestion window size (step S259).

In accordance with a preferred embodiment of the present invention, in steps S255 and S257, the MS 10 detects a frame error in a physical layer or a link layer associated with the radio network and notifies the TCP layer of the occurrence of the frame error. In more detail, it is determined whether packets received from either the IS-95B/2000 layer 109 as a physical layer or the RLP layer 107 as a link layer, among the communication protocols incorporated in the MS 10 shown in FIG. 2, include the frame error (step S255). If the received packets are determined to include the frame error, the IS-95B/2000 layer 109 or the RLP layer 107 including the frame error notifies a TCP layer incorporated in the MS of the occurrence of the frame error (step S257).

In accordance with another preferred embodiment of the present invention, in step S259, the retransmission request is made by transmitting a dummy segment having a TCP header with a certain flag set. In more detail, when a frame error is detected in a lower layer, the TCP layer is notified of the occurrence of TCP packet losses, then notifies a TCP layer on a transmission side of the occurrence of TCP packet losses by use of the dummy segment. Here, the dummy segment indicates a segment of 20~60 bytes which has only a header without data.

One of six reserved bits contained in a flag field of a TCP header is used to indicate the dummy segment.

Steps S257 and S259 are skipped when the frame error is not detected at step S255.

On the other hand, in accordance with another embodiment of the present invention, a packet data communication method in a communication server communicating with a plurality of MSs includes the steps of detecting errors having occurred in transmitted packet data during communication in a radio network (step S215) and of retransmitting the packet data without reducing the congestion window size (step S217).

In accordance with another preferred embodiment of the present invention, in step S215, the communication server determines a transmission error to have occurred if the communication server is notified by the MS of the error occurrence or if the communication server does not receive within a predetermined time from the MS an acknowledgement (ACK) message for acknowledging the receipt of the packet data. In more detail, when the communication server receives a dummy packet having a TCP header with a certain flag set, which implies the error occurrence, from the MS at step S259, the communication server determines a transmission error to have occurred in the radio network while the packet data is being transmitted to the MS. Furthermore, when the communication server transmits packet data and does not receive an ACK message from the MS until a retransmission timer expires, a transmission error is determined by the communication server to have occurred in the radio network while the packet data is being transmitted to the MS.

In the case when the communication server receives the dummy segment and thus determines a transmission error to have occurred, the communication server does not retransmit the packet data until the retransmission timer expires. Otherwise, the packet data is retransmitted once again when no ACK message is received from the MS. Alternatively, the communication server may re-initialize the retransmission timer and retransmit the packet data.

As described above, upon detecting errors having occurred in transmitted packet data during communication in a radio network, the communication server retransmits the packet data without reducing the congestion window size (step S217).

On the other hand, when the MS detects a transmission error in the IP or TCP layer rather than the physical and link layers, the detected transmission error is determined to have occurred in a wireline network (step S261). In this case, the IP or TCP layer does not send an ACK message for acknowledging the receipt of the packet data (step S263).

In accordance with another preferred embodiment of the present invention, a packet data communication method in the communication server further includes the steps of detecting errors having occurred in transmitted packet data during communication in a wireline network (step S219) and of retransmitting the packet data after reducing the congestion window size (step S221). In more detail, the communication server determines a transmission error to have occurred in the wireline network if the communication server does not receive from the TCP layer on a reception side an ACK message for acknowledging the receipt of the packet data until a retransmission timer of the TCP layer expires (step S219). In this case, the communication server reduces the congestion window size in accordance with a solution to packet losses in a typical wireline network, and retransmits corresponding data to a destination MS (step S221). Step S221 is skipped if the communication server receives the ACK message in step S219 and thus no error is determined to have occurred in the wireline network.

The MS and the communication server determine whether the communication has terminated after completion of the data transmission (step S265). If necessary, a call is released (step S267).

Figure 4:
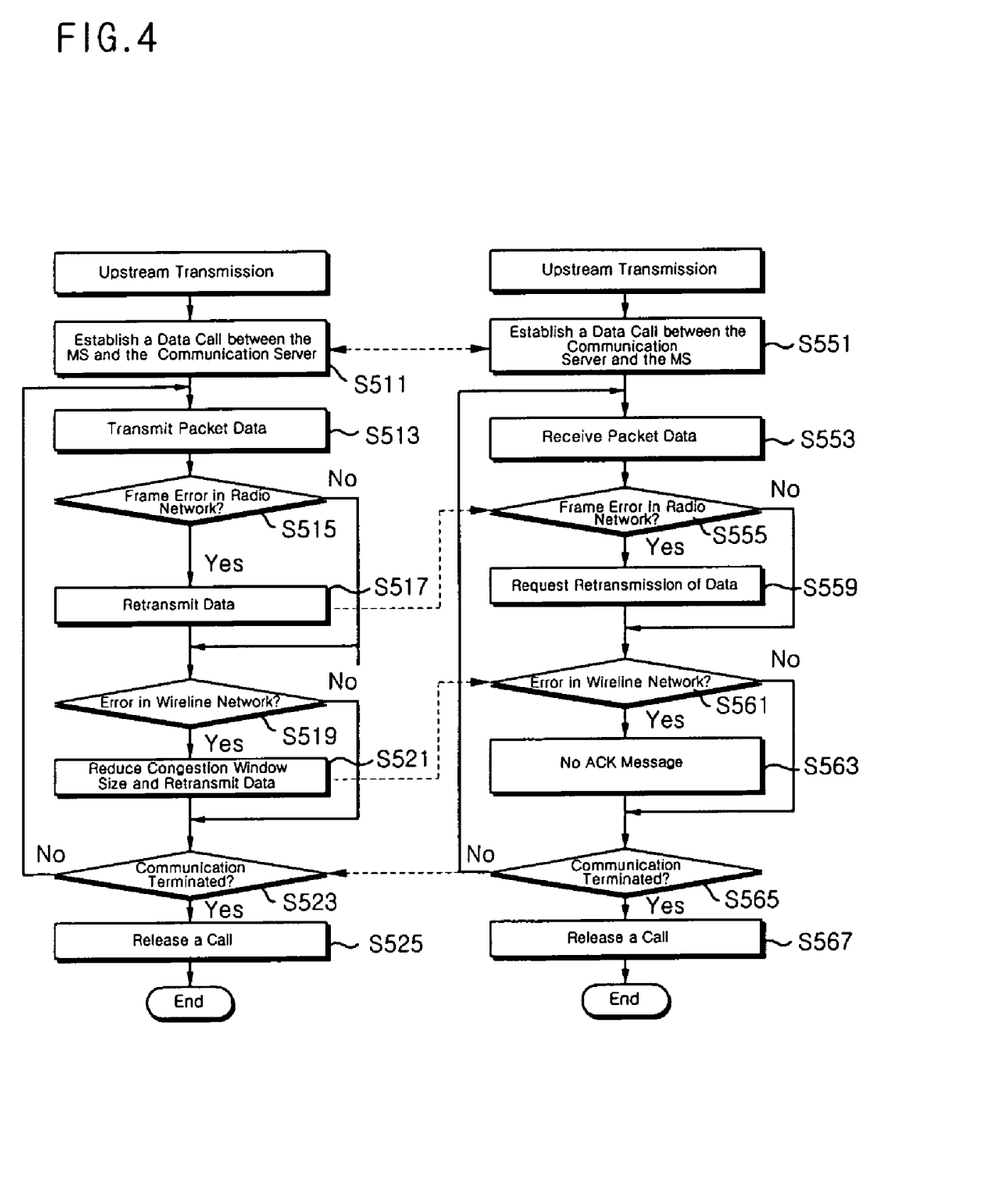
FIG. 4 is a flowchart showing upstream data communication in accordance with another embodiment of the present invention.

FIG. 4 is a flowchart showing upstream data communication in accordance with another embodiment of the present invention. A packet data communication method in an MS connected to a communication server over a mobile communication network is initiated by establishing a data call between the MS and the communication server (steps S511 and S551).

The MS transmits packet data (step S513). The communication server receives the packet data (step S553). In this case, the packet data communication method in the communication server includes the steps of detecting errors having occurred in received packet data during communication in a radio network (step S555) and of requesting the MS to retransmit the packet data without reducing the congestion window size (step S559).

In accordance with a preferred embodiment of the present invention, in step S555, the communication server detects a frame error in a physical layer of a link layer associated with a radio network and notifies the TCP layer of the occurrence of the frame error. In more detail, it is determined whether packets received from either the IS-95B/2000 layer 109 as a physical layer or the RLP layer 107 as a link layer, among the communication protocols incorporated in the radio network shown in FIGS. 1 and 2, include the frame error (step S555). A protocol associated with only the radio network is present between the MS and the radio network equipment, but not present between the radio network equipment and a wireline Internet server. Thus, the radio network equipment is needed for the wireline Internet server to detect errors in the radio network. Consequently, the communication server in accordance with the embodiment of the present invention may be one of radio network equipment 20. Alternatively, the communication server may be a wireline Internet server in the case where the radio network equipment 20 detects and notifies an error in the radio network to the wireline Internet server.

In accordance with another preferred embodiment of the present invention, in step S559, the retransmission request is made by transmitting a dummy segment having a TCP header with a certain flag set. When a frame error is detected in a lower layer of a radio communication network, the communication server recognizes that the frame error has been detected, and requests the MS to retransmit packet data by sending a fixed dummy packet to the MS. Here, the dummy segment indicates a segment of 20~60 bytes which has only a header without data. One of six reserved bits contained in a flag field of a TCP header is used to indicate the dummy segment.

On the other hand, in accordance with another embodiment of the present invention, a packet data communication method in the MS communicating with the communication server includes the steps of detecting errors having occurred in transmitted packet data during communication in a radio network (step S515) and of retransmitting the packet data without reducing the congestion window size (step S517).

In accordance with another preferred embodiment of the present invention, in step S515, the MS determines a transmission error to have occurred if the MS is notified by the communication server of the error occurrence or if the MS does not receive within a predetermined time from the communication server an acknowledgement (ACK) message for acknowledging the receipt of the packet data. In more detail, when the MS receives a dummy packet having a TCP header with a certain flag set, which implies the error occurrence, from the communication server at step S559, the MS determines a transmission error to have occurred in the radio network while the packet data is being transmitted to the communication server. Furthermore, when the MS transmits packet data and does not receive an ACK message from the communication server until a retransmission timer expires, a transmission error is determined by the MS to have occurred in the radio network while the packet data is being transmitted to the communication server.

In the case when the MS receives the dummy segment and thus determines a transmission error to have occurred, the MS does not retransmit the packet data until the retransmission timer expires. Otherwise, the packet data is retransmitted again when no ACK message is received from the communication server. Alternatively, the MS may re-initialize the retransmission timer and retransmit the packet data.

As described above, upon detecting errors having occurred in transmitted packet data during communication in a radio network, the MS retransmits the packet data without reducing the congestion window size (step S517). On the other hand, step S517 is skipped when the frame error is not detected in the radio network at step S515.

On the other hand, when the communication server detects a transmission error in the IP or TCP layer rather than the physical and link layers, the detected transmission error is determined to have occurred in a wireline network (step S561). In case of the TCP layer, a transmission side determines a transmission error to have occurred if a reception side does not notify the occurrence of the transmission error to the transmission side and does not send an ACK message until a retransmission timer expires (step S563). A server which uploaded data finally reaches through the wireline network, such as a content server on the wireline Internet, determines whether or not the transmission error has occurred.

In accordance with another preferred embodiment of the present invention, a packet data communication method in the MS further includes the steps of detecting errors having occurred in transmitted packet data during communication in a wireline network (step S519) and of retransmitting the packet data after reducing the congestion window size (step S521). In more detail, the MS determines a transmission error to have occurred in the wireline network if the MS does not receive from the TCP layer on a reception side an ACK message for acknowledging the receipt of the packet data until a retransmission timer of the TCP layer expires (step S519). In this case, the MS reduces the congestion window size in accordance with a solution to packet losses in a typical wireline network, and retransmits corresponding data to the communication server (step S521). Step S521 is skipped if the communication server receives the ACK message in step S519 and thus no error is determined to have occurred in the wireline network.

The communication server and the MS determine whether the communication has terminated after completion of the data transmission (steps S523 and S565). If necessary, a call is released (steps S525 and S567).

Figure 5:
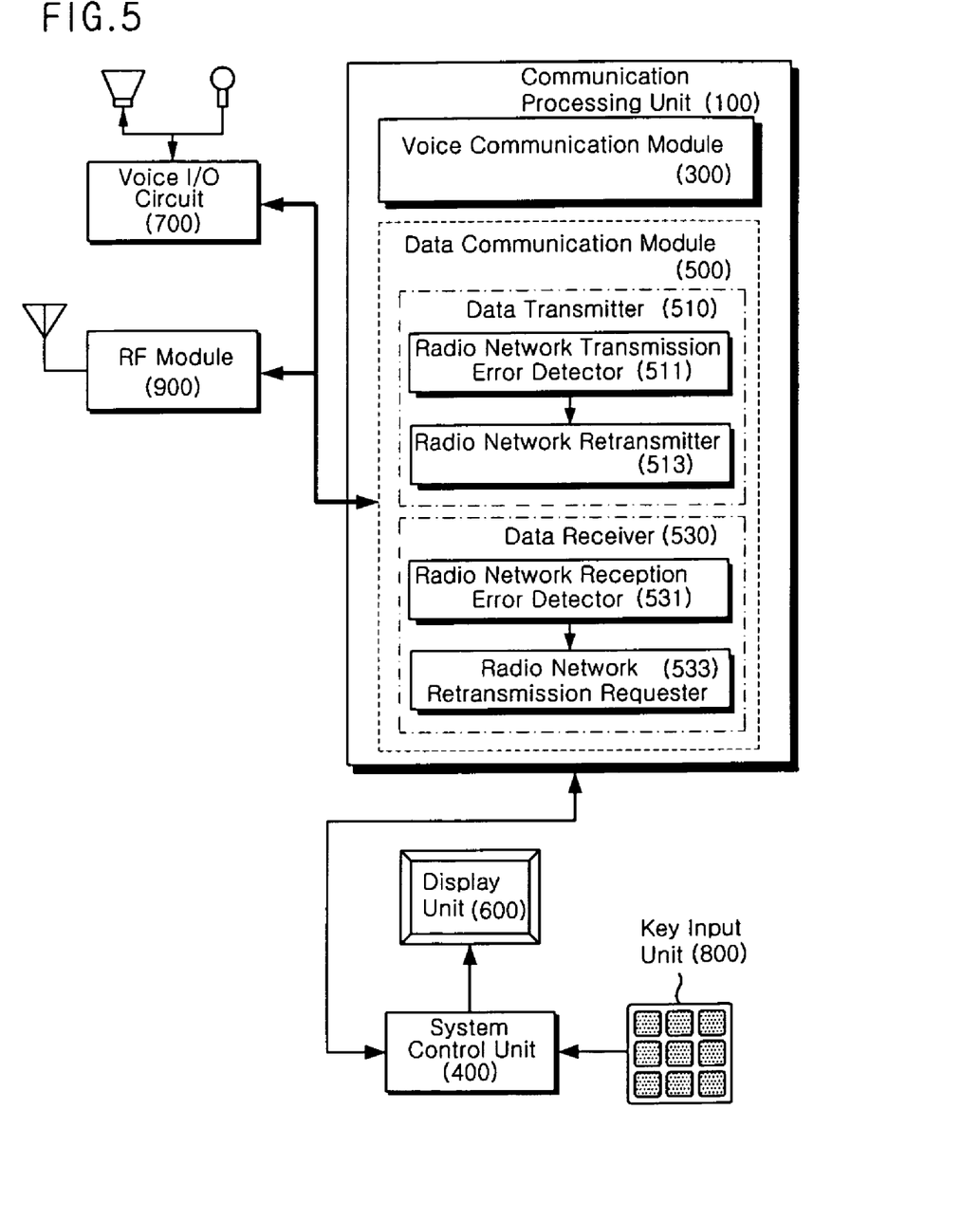
FIG. 5 is a block diagram showing the configurations of the MS in accordance with another embodiment of the present invention.

FIG. 5 is a block diagram showing the configurations of the MS in accordance with another embodiment of the present invention. The MS comprises a communication processing unit 100, a system control unit 400, a display unit 600, a voice input/output (I/O) circuit 700, a key input unit 800, and a radio frequency (RF) module 900.

The RF module 900 is one used for detecting voice and data signals from radio signals transmitted or received via an antenna. The voice I/O circuit 700 is one for inputting/outputting voice signals, which are received from the RF module 900, via a microphone/speaker.

The configurations of the key input unit 800 and the display unit 600 are well-known in the art, and thus their detailed description is omitted here. The RF module 900 comprises an antenna and an RF circuit to communicate with a base station. The RF module 900 is designed to be available in all cellular systems such as TDMA, CDMA, PDC, and GSM. The voice I/O circuit 700, which comprises well-known circuits such as an audio amplifier and a filter, converts digital into analog voice signals and vice versa.

A baseband circuit of the RF module 900, the communication processing unit 100, and the system control unit 400 are integrated into a single chip, which is commercially available. This IC chip, which is called a mobile station modem (MSM) chip, includes a hardware dedicated for communication processing, a digital signal processor, and a general-purpose microprocessor. Logically, the IC chip includes the communication processing unit 100 for controlling voice and data communications, and the system control unit 400 for controlling the overall system according to input signals from the key input unit 800. The communication processing unit 100 includes a typical voice communication module 300 for processing voice communication.

In accordance with another embodiment of the present invention, the MS can be connected to the communication server over a mobile communication network. The MS includes a data communication module 500 which retransmits or requests to retransmit packet data without reducing the congestion window size when an error is detected in the packet data transmitted or received during communication in a radio network.

In accordance with a preferred embodiment of the present invention, the data communication module 500 includes a data transmitter 510 and a data receiver 530. The data transmitter 510 includes a radio network transmission error detector 511 and a radio network retransmitter 513. The radio network transmission error detector 511 determines whether an error has occurred in transmitted packet data during communication in the radio network. The radio network retransmitter 513 retransmits the packet data without reducing the congestion window size when the occurrence of the error is detected by the radio network transmission error detector 511. The data receiver 530 includes a radio network reception error detector 531 and a radio network retransmission requester 533. The radio network reception error detector 531 determines whether an error has occurred in received packet data during communication in the radio network. The radio network retransmission requester 533 requests the communication server to retransmit the packet data without reducing the congestion window size when the occurrence of the error is detected by the radio network reception error detector 531.

In this case, the radio network reception error detector 531 detects a frame error in packet data received from either the IS-95B/2000 layer as a physical layer or the RLP or PPP layer as a link layer, as shown in FIG. 2, and notifies the TCP layer in the MS of the occurrence of the frame error. On the other hand, the radio network retransmission requester 533 requests retransmission of the packet data by transmitting a dummy segment having a TCP header with a certain flag set. A transmission error is determined by the radio network transmission error detector 511 to have occurred if the radio network transmission error detector 511 is notified by the communication server of the error occurrence or receives no ACK message within a predetermined time from the communication server. Further, the radio network transmission error detector 511 detects the error occurrence by checking a predetermined flag in the TCP header.

According to the present invention, it is possible to increase transfer rate by processing transmission errors occurred in the radio network and the wireline network in different schemes.

Further, it is possible not to reduce transmission efficiency during communication in the radio network. In addition, it is possible efficiently determine whether the transmission error has occurred in the wireline network or in the radio network.

While the present invention has been described with reference to exemplary embodiments thereof, it will be understood by those skilled in the art that various changes in form and details may be made therein without departing from the scope of the present invention as defined by the following claims.

What is claimed is:

1. A packet data communication method carried out by an MS (mobile station) connected to a communication server over a mobile communication network, the method comprising:
   detecting an error having occurred in received packet data during communication in a radio network, and determining that a congestion window size should not be reduced if the error is detected by the MS in a lower layer associated with the radio network;
   requesting the communication server to retransmit the packet data without reducing the congestion window size if the error is detected by the MS in the lower layer associated with the radio network;
   detecting an error having occurred in received packet data during communication in a wireline network; and
   requesting the communication server to retransmit the packet data after reducing the congestion window size by not transmitting an acknowledgment message to the communication server,
   wherein the requesting of the communication server to retransmit the packet data without reducing the congestion window size comprises transmitting a dummy segment having a TCP header with a certain flag set, the dummy segment comprising a segment of 20 to 60 bytes without data.

2. The method as set forth in claim 1, wherein the detecting the error having occurred in received packet data during communication in the radio network comprises detecting, by the MS, a frame error in a physical layer or a link layer associated with the radio network and notifying a TCP (Transmission Control Protocol) layer of the occurrence of the frame error.

3. A packet data communication method carried out by a mobile station (MS) connected to a communication server over a mobile communication network, the method comprising:
   detecting an error having occurred in packet data transmitted by the MS during communication in a radio network, and determining that a congestion window size should not be reduced if the error is detected by the MS in a lower layer associated with the radio network,
   receiving a request to retransmit the packet data without reducing the congestion window size if the error is detected by the MS in a lower layer associated with the radio network, and retransmitting the packet data without reducing the congestion window size;
   detecting an error having occurred in packet data transmitted by the MS during communication in a wireline network; and
   retransmitting the packet data after reducing the congestion window size in response to not receiving an acknowledgement message from the communication server within a specific time,
   wherein the receiving the request comprises receiving a dummy segment having a TCP header with a certain flag set, the dummy segment comprising a segment of 20 to 60 bytes without data.

4. The method as set forth in claim 3, wherein in the detecting the error having occurred in transmitted packet data during communication in the radio network, the MS determines a transmission error to have occurred if the MS is notified by the communication server of the error occurrence in the radio network.

5. The method as set forth in claim 3, wherein in the detecting the error having occurred in transmitted packet data during communication in the radio network, the MS determines a transmission error to have occurred if the MS does not receive within a predetermined time from the communication server an ACK (acknowledgement) message for acknowledging the receipt of the packet data.

6. A mobile station (MS) connected to a communication server over a mobile communication network, comprising:
   a data communication module
     to retransmit packet data in response to a request to retransmit the packet data without reducing the congestion window size if an error is detected by the MS in the packet data transmitted during communication in a radio network and if the error is detected in a lower layer associated with the radio network, and to request a sender to retransmit packet data without reducing the congestion window size if an error is detected by the MS in the packet data received during communication in the radio network, and if the error is detected in a lower layer associated with the radio network, and
     to retransmit packet data in response to a request to retransmit the packet data with a reduced congestion window size if an error is detected by the MS in the packet data transmitted during communication in a wireline network, if the error is detected in an IP or TCP layer associated with the wireline network, and if no acknowledgment message is received from the communication server, and to request the sender to retransmit packet data with a reduced congestion window size by not transmitting an acknowledgment message to the communication server if an error is detected by the MS in the packet data received during communication in the wireline network, and if the error is detected in a IP or TCP layer associated with the wireline network;
   a radio network reception error detector to determine if the error has occurred in received packet data in the lower layer associated with the radio network; and
   a radio network retransmission error detector to determine if the error has occurred in transmitted packet data in the lower layer associated with the radio network,
   wherein the request to retransmit comprises a dummy segment having a TCP header with a certain flag set, the dummy segment comprising a segment of 20 to 60 bytes without data.

7. The MS as set forth in claim 6, wherein the data communication module comprises:
   a data transmitter comprising:
     a radio network retransmitter to retransmit the packet data without reducing the congestion window size if the occurrence of the error is detected by the radio network transmission error detector, and
   a data receiver comprising:
     a radio network retransmission requester to request the communication server to retransmit the packet data without reducing the congestion window size if the occurrence of the error is detected by the radio network reception error detector.

8. The MS as set forth in claim 7, wherein the radio network reception error detector detects a frame error in a physical layer or a link layer associated with the radio network and notifies a TCP layer of the occurrence of the frame error.

9. The MS as set forth in claim 7, wherein the radio network transmission error detector determines the error to have occurred in the transmitted packet data if the radio network transmission error detector is notified by the communication server of the error occurrence or does not receive within a predetermined time from the communication server an ACK message for acknowledging the receipt of the packet data.

10. The MS as set forth in claim 9, wherein the radio network transmission error detector detects the notification of the communication server by checking the certain flag in the TCP header.

11. A packet data communication method carried out by an MS (mobile station) connected to a communication server over a mobile communication network, the method comprising:

receiving packet data transmitted by the communication server;

detecting an error in the received packet data during communication in a radio network, and determining that a congestion window size should not be reduced if the error is detected by the MS in a lower layer associated with the radio network; and requesting the communication server to retransmit the packet data without reducing a congestion window size if the error is detected by the MS in the lower layer associated with a radio network of the mobile communication network;

detecting an error having occurred in received packet data during communication in a wireline network; and requesting the communication server to retransmit the packet data after reducing the congestion window size by not transmitting an acknowledgement message to the communication server if the error is in the wireline network of the mobile communication network;

wherein the requesting of the communication server to retransmit the packet data without reducing the congestion window size comprises transmitting a dummy segment having a TCP header with a certain flag set, the dummy segment comprising a segment of 20 to 60 bytes without data.

* * * * *